No. 683,530. B. VESSELS. Patented Oct. 1, 1901.
POKE.
(Application filed Apr. 1, 1901.)
(No Model.)
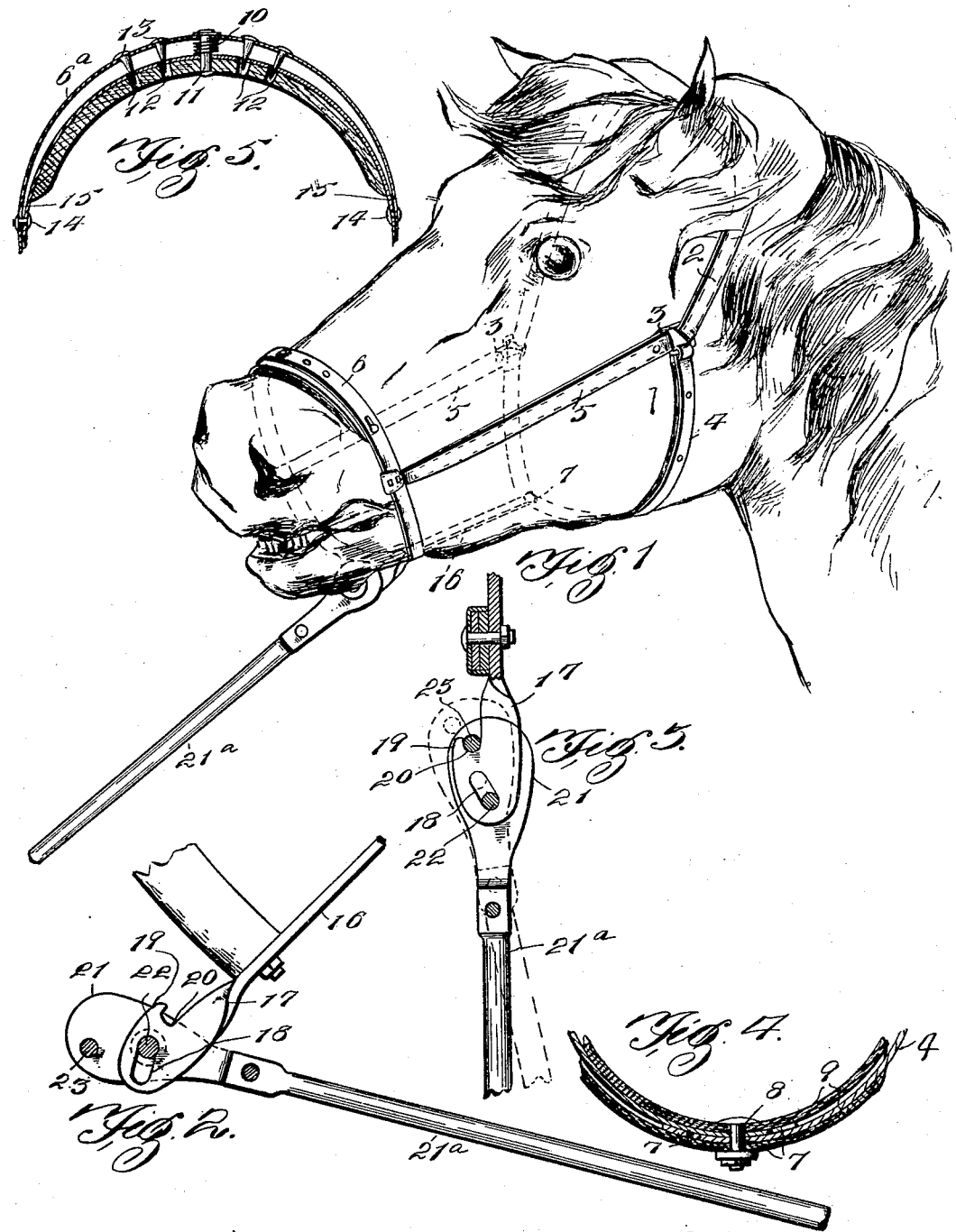
Witnesses
Benjamin Vessels, Inventor
By C. A. Snow & Co.
Attorneys

UNITED STATES PATENT OFFICE.

BENJAMIN VESSELS, OF PERRYVILLE, MISSOURI.

POKE.

SPECIFICATION forming part of Letters Patent No. 683,530, dated October 1, 1901.

Application filed April 1, 1901. Serial No. 53,884. (No model.)

*To all whom it may concern:*

Be it known that I, BENJAMIN VESSELS, a citizen of the United States, residing at Perryville, in the county of Perry and State of Missouri, have invented a new and useful Poke, of which the following is a specification.

This invention relates to animal-pokes; and the object of the same is to provide a simple and effective device of this class that will prevent jumping fences, fighting, or cribbing and wherein the parts have a partial automatic operation to dispose a projecting bar or rod rigidly in position to prevent fence-jumping and also to loosen the same, so that it may be turned out of the way when the animal desires to graze, the improved device being of a comparatively simple and strong and durable nature.

The invention consists in the construction and arrangement of the several parts, which will be more fully hereinafter described and claimed.

In the drawings, Figure 1 is a perspective view of the improved device shown applied and the projecting bar or rod in rigid operative position. Fig. 2 is a side elevation of a portion of the improved device, showing the projecting bar or rod turned back, a part of the rod or bar being in section. Fig. 3 is a longitudinal section through the connecting-joint for the projecting bar or rod and a transverse section through a portion of the nose-band and showing a part of said bar or rod. Fig. 4 is a longitudinal vertical section through one of the supporting-bands. Fig. 5 is a longitudinal vertical section through the upper portion of the nose-band.

Similar numerals of reference are employed to indicate corresponding parts in the several views.

The numeral 1 designates a headstall comprising a crown-strap 2, which is made, as usual, with means for easily disconnecting or adjusting the same and terminally attached to loops 3, movably held in the upper ends of a stiff band 4, which is applied under the head of the animal in rear of the lower jaw. From the loops 3 opposite cheek-straps 5 extend and connect at their front extremities with a nose-band 6, which is formed to completely encircle the muzzle of the animal. The ends of the band 4 at the lower portion of the latter are overlapped and apertured, as at 7, and connected by a single removable bolt 8, as shown by Fig. 4, and by this means said band may be lengthened or shortened to adapt it to fit the heads of animals of different size and shape, and to soften the bearing of said band it is provided with a leather or other cover or pad 9. The nose-band is also intended to be suitably covered, at least in part, and on the upper portion thereof is applied an arcuate yielding carrier in the form of a spring-strip $6^a$, which normally stands above the portion of the band to which it is applied, as shown by Fig. 5, and is positively held and returned to its normal upstanding position after operation by a spring 10, interposed between the same and the band and surrounding a pin 11, engaging the center of the band and strip and accurately guiding the latter in its movement. The nose-band on opposite sides of the center of the upper portion thereof has a series of openings 12 therein, through which pointed pins 13, fixedly carried by the strip $6^a$, have free movement, the pointed ends of the said pins being inward, so that they will stick the nose of the animal and cause him to desist in cribbing or rubbing or attempting such operations, the carrier being intended and designed for this purpose. The opposite extremities of the strip $6^a$ are held on the nose-band by headed rivets or pins 14, that extend through slots 15 in the strip extremities, the said slots being long enough to permit compression of the strip to effectually perform its function. It will be seen that as soon as pressure is brought to bear on the strip $6^a$ by contact with adjacent objects, such as fence-rails or the like, the pins 13 will be brought into contact with the nose of the animal to check such operations for which the attachment is intended to overcome, and after relaxation of pressure on the strip the latter will immediately return to its normal position.

The lower central portion of the band 4 and the similar portion of the nose-band 6 are connected by a straight bar 16, of metal, to thereby hold said parts permanently spaced apart from each other in rigid relation, and the lower extremity of the said bar is continued beyond and forwardly from the nose-band and given a quarter-twist and flattened to form a broadened hanger 17 in a plane at a right angle to the bar. The said hanger has a slot 18 formed therein and inclined upwardly toward the outer or forward curved edge 19 of the hanger in a rearward direction, the said curved edge terminating in a hook-like seat 20 in rear of the location of the said slot. Attached to this hanger is the upper bifurcated broadened head 21 of a projecting bar or rod 21ᵃ, the said head having a transverse pin 22 movably engaging the slot 18 and another transverse pin 23 in rear of and outwardly from the plane of the pin 22 to removably engage the hook-like seat 20, as clearly shown by Fig. 3. The rod or bar 21ᵃ will be of a suitable length and of such strength as to resist breakage under ordinary service.

The projecting bar or rod 21ᵃ has an automatic operation in view of the shiftable fulcrum therefor comprising the pin 22, working loosely in the slot 18, so that when a horse throws up his head, as in the act of jumping a fence, the rod or bar will be thrown out straight, and during such movement thereof the pin 23 will slide over the curved edge 19 beyond the hook-like seat and gravitate into said seat and become locked, and thereby hold the said rod or bar rigid to offer a resistance by striking a fence-rail or the like and break the effort of the animal in his attempt to jump. When the horse lowers his head to graze, the lower end of the rod or bar first strikes the ground and the pressure exerted longitudinally thereon pushes the pin 23 out of engagement with the hook-like seat 20 and permits the said rod or bar to fold under the muzzle of the horse out of the way, as clearly shown by Fig. 2. The same operation of locking the rod or bar will be effected when a horse wearing the device viciously starts at another with a view of fighting, the rod or bar becoming locked and warding off the opposing animal and preventing both animals from coming into close engagement with each other. If this locking operation should ensue during any other movement of the horse's head and while standing in quiet, the same mode of unlocking the same will ensue as soon as the head of the animal is lowered and the bar or rod engages the ground, as already explained.

The headstall can be adjusted to fit any head, and the entire device is fully equipped to break an animal of vicious habits and bad tendencies, and in view of the simplicity of the entire device it can be cheaply manufactured.

Having thus described the invention, what is claimed as new is—

1. A poke combined with a headstall including a crown-strap, a stiff band connected thereto and having the ends adjustably overlapped, said ends being located at the lower central portion of the band, a nose-band to completely surround the muzzle of the animal to which the device is applied, cheek-straps connecting the two bands, a lower metallic bar also connecting the bands and projected at the front extremity, the latter extremity having a slot and seat, and a projecting bar or rod movably connected to said extremity and having pins to engage the said slot and seat.

2. A poke of the class set forth comprising a rigid support, and a projecting bar or rod with its inner extremity movably connected to the front terminal of said support, and means for immovably locking the engaging parts of said bar or rod and support, whereby the bar or rod will become automatically locked against movement when thrown upwardly and remain in rigid relation to the support until lowered and brought into contact with the ground surface when a release of the rod or bar is immediately effected.

3. A poke of the class set forth comprising a rigid supporting-bar having a forward flattened end with a slot therein and an upper hook-like seat in rear of the slot, and a projecting rod or bar having a bifurcated head to movably embrace said end and provided with separated transverse pins to respectively engage the slot and seat.

In testimony that I claim the foregoing as my own I have hereto affixed my signature in the presence of two witnesses.

BENJAMIN VESSELS.

Witnesses:
AUGUSTUS DOERR,
JOHN DOSSENBACH.